United States Patent [19]

Paton et al.

[11] 4,323,752
[45] Apr. 6, 1982

[54] PIPE RESISTANCE BUTT WELDING APPARATUS

[76] Inventors: Boris E. Paton, ulitsa Chkalova, 41-a, kv. 26; Vladimir K. Lebedev, ulitsa Engelsa, 25, kv. 12; Sergei I. Kuchuk-Yatsenko, ulitsa Filatova, 1/22, kv. 47; Vasily A. Sakharnov, ulitsa Solomenskaya, 41, kv. 93; Boris A. Galyan, ulitsa Lenina, 88/92, kv. 110, all of Kiev, U.S.S.R.

[21] Appl. No.: 136,698

[22] Filed: Apr. 2, 1980

[30] Foreign Application Priority Data

Jun. 5, 1979 [SU] U.S.S.R. ............... 2766303
Jun. 14, 1979 [SU] U.S.S.R. ............... 2770751

[51] Int. Cl.³ .................. B23K 11/04; B23K 37/04
[52] U.S. Cl. ................... 219/101; 219/60 R; 219/66; 219/97; 228/49 B
[58] Field of Search ............ 219/60 R, 66, 97, 100, 219/101; 228/44.5, 49 B

[56] References Cited

U.S. PATENT DOCUMENTS

| | | | |
|---|---|---|---|
| 3,164,712 | 1/1965 | Paton et al. | 219/101 |
| 3,355,792 | 12/1967 | Cunningham | 228/44.5 X |
| 3,979,041 | 8/1976 | Kaneyama et al. | 228/49 B |
| 4,053,973 | 10/1977 | Meli | 228/44.5 X |
| 4,253,599 | 3/1981 | Slavens | 228/49 B |
| 4,273,895 | 6/1981 | Paton et al. | 219/60 R |

FOREIGN PATENT DOCUMENTS

| | | | |
|---|---|---|---|
| 2201966 | 8/1972 | Fed. Rep. of Germany | 228/44.5 |
| 249507 | 10/1968 | U.S.S.R. | |
| 292743 | 3/1971 | U.S.S.R. | 219/101 |
| 326031 | 3/1972 | U.S.S.R. | |
| 361050 | 1/1973 | U.S.S.R. | |

OTHER PUBLICATIONS

*Welding Design & Fabrication,* Feb. 1979, pp. 49–53; "Flash Butt Welding a 56-inch Pipeline" by Ted B. Jefferson.

*Primary Examiner*—J. V. Truhe
*Assistant Examiner*—Keith E. George
*Attorney, Agent, or Firm*—Fleit & Jacobson

[57] ABSTRACT

A pipe resistance butt welding apparatus disposable within the pipes to be welded comprises a fixed expanding clamp and a movable expanding clamp, provided with clamping elements and actuating cylinders and intended to fix the pipes to be welded with respect to the apparatus. A cylinder to effect an axial movement of the movable expanding clamp is installed at the end at which this expanding clamp is located; the axial movement provides for drawing together the ends of the pipes to be welded in the course of fusion and upsetting. The cylinder for the axial movement of the movable expanding clamp is coupled with the actuating cylinder of the same clamp and with the clamping elements. The devices making up the apparatus and the cylinders are coaxially installed within a body wherefrom the clamp elements extend outwardly to engage the inner surface of the pipes being welded. Modifications of the apparatus for weld-joining of medium and large diameter pipes respectively are also described.

5 Claims, 2 Drawing Figures

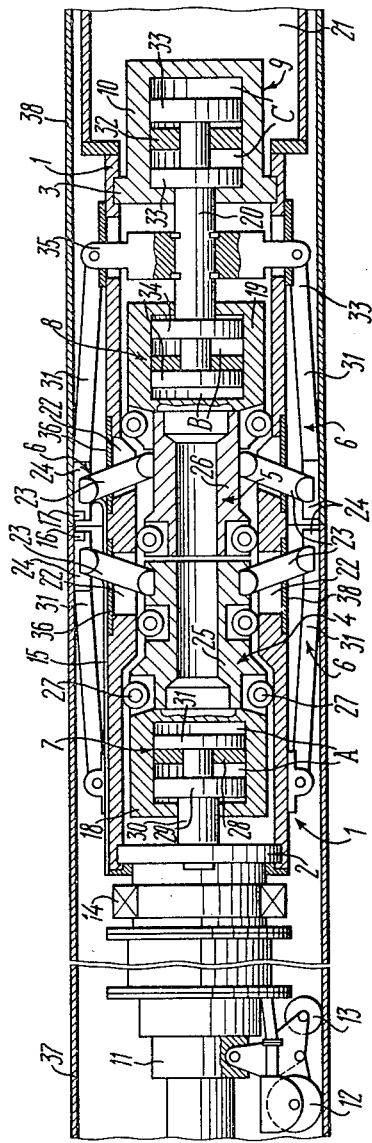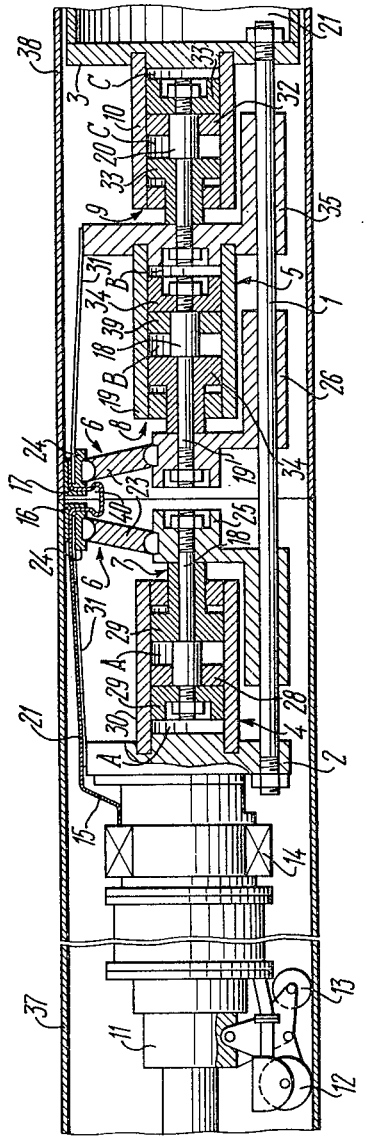

PIPE RESISTANCE BUTT WELDING APPARATUS

BACKGROUND OF THE INVENTION

1. Field of the Invention

The present invention relates to apparatus for the resistance butt welding of pipes of petroleum and gas trunk pipelines.

In the welding engineering practice, resistance butt welding apparatus are conventionally divided into the following three types:

first, the so-called external resistance butt welding apparatus (refer, e.g. to USSR Inventor's Certificates Nos. 231,041; 361,050; and 178,425) wherein all the apparatus' mechanisms are disposed outside of the pipes being joined. Such apparatus are quite effective for welding pipes of relatively small (140 to 520 mm) diameters, but unsuitable for handling medium and large diameter pipes, since in this case such apparatus become too bulky and heavy while featuring an inadequate stiffness;

second, the so-called combined resistance butt welding apparatus (refer, e.g., to USSR Inventor's Certificate No. 249,507) wherein the devices for alignment, for securing the apparatus in position inside the pipes, for upsetting and axially moving one pipe towards the other are disposed inside the pipes, whereas the welding transformer and current-feeding devices are located outside of the pipes. The combined apparatus are employed to weld medium diameter (520 to 820 mm) pipes under stationary conditions, which obviously limits their application. Besides, the arrangement of the welding apparatus' devices both inside and outside of the pipes being welded impedes the access to the joint being formed between the pipes. The apparatus are rather bulky and complex to operate;

third, the so-called internal resistance butt welding apparatus (refer to USSR Inventor's Certificate Nos. 136,487; 292,743; and 326,031), wherein all the mechanisms are disposed within the pipes to be joined. In construction of trunk pipelines when welding apparatus has to be moved along the pipeline being laid from a finished joint to the next one to be welded, the welding apparatus of the internal type is the most effective, because in operation it travels inside the pipes, which is an ideal way therefor when a pipeline is laid over an off-road terrain.

Despite the apparent advantages of the internal welding apparatus, their practical application has heretofore been limited because of the rigid requirements their construction has to meet and the complexity of their manufacture.

The present invention is specifically concerned with a pipe resistance butt welding apparatus disposable inside the pipes to be welded.

2. Description of the Prior Art

One of the earliest resistance butt welding apparatus of the internal type was that disclosed in the USSR Inventor's Certificate No. 136,487. This apparatus, intended for butt welding the ends of mainly large diameter pipes, comprises an elongated cylindrical body which carries telescopically mounted internal expanding clamp for fixing the pipes to be welded with respect to the apparatus, and cylinders. Two of the cylinders serve to actuate, i.e. to expand, the clamps and thereby to hold the apparatus in position inside the pipes being welded, and the third cylinder is intended to move one of these clamps axially when the pipes are being drawn together or upset. Like most of the internal apparatus, this apparatus has a drive and a motor to move it inside the pipes, and a welding transformer. A large diameter of the telescopic cylinders used in the above apparatus complicates both the manufacture and the operation and maintenance thereof. This in particular applies to the sealing of lengthy clearances between the cylinder and the body of the apparatus and between the annular rod and the annular cylinder body.

There is also known a pipe resistance butt welding apparatus (USSR Inventor's Certificate No. 292,743) comprising an elongated carrying body having two coaxially mounted supporting disks to which a fixed internal expanding clamp and a movable internal expanding clamp are respectively coupled, either of which expanding clamps has clamp elements to hold in position the apparatus inside the pipes being welded and is provided with its actuating cylinder, a cylinder secured directly to the respective supporting disk and serving to move the movable expanding clamp axially and to draw together the ends of the pipes, a drive to move the apparatus along the pipes being welded, and a ring welding transformer.

The carrying body is made in the form of a tube resting at its ends on static supports installed outside of the pipes. The fixed and movable expanding clamps are installed on the body; either of the clamps is essentially a collet mechanism having a set of outer segments making up a ring and interacting by their inside conical surface with the conical surface of expanding disks which are coupled with the rods of a plurality of cylinders serving to actuate the clamps. Said cylinders are radially offset from the axis of the apparatus and secured to the supporting disks fixedly installed on the body.

The cylinder for axially moving the movable expanding clamp is also radially offset and installed on the fixed disk. The rod of the cylinder passes through apertures in the fixed and movable expanding clamps and is coupled to a movable disk which acts upon the movable expanding clamp when the pipes being welded are being drawn together and upset.

Thus, the expanding (clamping) effort required to align the pipes being welded and to fix the apparatus inside these pipes is produced in the above-described apparatus by a plurality of relatively small cylinders, which solves the problem of providing a dependable sealing of the hydraulic system. At the same time, however, this construction gives rise to a difficulty in ensuring an accurate positioning of the cylinders, because an error in their positioning may cause angular misalignments and, as a consequence, a failure of the apparatus.

Also, the use of a plurality of cylinders disposed circumferentially around the axis of the apparatus, first, increases the size and complicates both the construction and operation of the apparatus and, secondly, fails to provide a concentrated axial force needed for an accurate alignment of pipes, upon which the weld quality depends.

Further, it is difficult to feed the working fluid to a plurality of cylinders disposed around and along the carrying body, and the location of the welding transformer in the zone of a joint being welded leads to a larger diametrical size of the apparatus, thereby making it unsuitable for welding medium diameter pipes.

In addition, the stiffness of the apparatus is not sufficient which is due to the fact that a long carrying body (tube) of a relatively small diameter carries essentially all the apparatus' devices. It is quite clear that an inadequate stiffness of the apparatus may eventually exert an adverse effect upon the weld quality.

SUMMARY OF THE INVENTION

An object of the present invention is to provide a resistance butt welding apparatus disposed inside the pipes being welded, which apparatus ensures a high-quality welding of pipes.

Another object of the invention is to provide a resistance butt welding apparatus which, having a smaller weight and size, features a higher stiffness.

Still another object of the invention is to provide a resistance butt welding apparatus of a simpler construction.

Yet another object of the invention is to provide a resistance butt welding apparatus which, having a simple construction, ensures a reliable alignment of the ends of pipes to be welded.

A further object of the invention is to provide a pipe resistance butt welding apparatus offering a higher dependability as compared to those known in the art.

A still further object of the invention is to provide a pipe resistance butt welding apparatus offering broader welding potentialities as compared to the prior art.

The above-mentioned and other objects are attained by that in a resistance butt welding apparatus disposable within the pipes to be welded, comprising an elongated carrying body having two coaxially mounted supporting disks to which a fixed expanding clamp and a movable expanding clamp are respectively coupled, each expanding clamp has clamp elements to locate the pipes being welded with respect to the apparatus and is provided with its actuating cylinder, a cylinder secured by its fixed part to the respective supporting disk and serving to move the movable expanding clamp axially and to draw together the ends of the pipes being welded, a drive to move the apparatus along the pipes being welded, and a ring welding transformer, according to the invention, said expanding clamps and cylinders are located within the carrying body and installed coaxially, the movable parts of the actuating cylinders of the expanding clamps being coupled with the clamp elements and adapted for movement on the inner surface of the carrying body, and the movable part of the cylinder serving to move the movable expanding clamp axially being connected with the actuating cylinder of this clamp.

The arrangement of the movable and fixed clamps with their actuating cylinders inside the carrying body considerably increases the stiffness of the apparatus. The coaxial arrangement of the cylinders provides for producing a concentrated axial force which ensures a reliable alignment of the pipes being welded. All these factors upgrade the weld quality. Also, such an arrangement of the devices improves the general configuration of the apparatus, reduces its weight and size, and enhances the accessibility of its components both in assembling and in operating the apparatus.

The carrying body may have the form of a tube with slots for the clamp elements to extend outwardly, the movable parts of the cylinders may be provided with rolling bearings, and the fixed part of the actuating cylinder of the fixed expanding clamp may be a rod rigidly attached to the respective supporting disk; in this modification, the cylinder serving to move the movable expanding clamp axially and the actuating cylinder of this clamp are interconnected by a common rod whereon it is advisable to fixedly mount a disk pivotally coupled through tie rods with the clamp elements.

A tubular carrying body considerably increases the stiffness of the apparatus, which improves the quality of welding of large diameter pipes. In addition, along with performing the carrying functions, the tubular body also serves as a housing which reliably protects the apparatus' devices from sparks and molten metal splashes.

Alternatively, the carrying body may be formed by at least two bars secured by their ends to the supporting disks and carrying the movable parts of the cylinders so as to permit a sliding movement thereof. In this modification, the body of the actuating cylinder of the fixed expanding clamp should be rigidly attached to the respective supporting disk, and the rod of the cylinder serving to move the movable expanding clamp axially should be movable and coupled with the body of the actuating cylinder of the movable expanding clamp, and a disk coupled by leaf springs with current-feeding shoes disposed on the clamp elements should be installed on said rod.

The use of a carrying body formed by bars whereon the expanding clamps are mounted on sliding bearings allows, while retaining the stiffness of the apparatus, to reduce its weight and size and thereby enables the apparatus to be used for welding medium diameter pipes.

The welding transformer is connected with the current-feeding shoes preferably by at least two buses which are expediently disposed on the leaf springs of the fixed expanding clamp; an end of one bus should be secured to the current-feeding shoes of this clamp, and an end of the other bus should be coupled by a flexible jumper with the current-feeding shoe of the movable expanding clamp.

Such an arrangement of the buses reduces the size of the apparatus, and such a connection of the current-feeding shoes cuts down both the ohmic and the inductive resistance of the transformer's secondary circuit.

BRIEF DESCRIPTION OF THE DRAWINGS

The invention will now be explained by a detailed description of the pipe resistance butt welding apparatus with reference to the accompanying drawings, wherein identical parts are designated by identical reference numerals, and wherein:

FIG. 1 is a diagrammatic axial sectional view of one modification of the resistance butt welding apparatus of the invention; and FIG. 2 is a diagrammatic axial sectional view of another modification of the resistance butt welding apparatus of the invention.

DETAILED DESCRIPTION OF THE PREFERRED EMBODIMENTS OF THE INVENTION

Referring to FIGS. 1 and 2, a pipe resistance butt welding apparatus disposed inside the pipes being joined comprises an elongated carrying body 1 having two coaxially mounted supporting disks 2 and 3, to which a fixed expanding clamp 4 and a movable expanding clamp 5 are respectively coupled. The expanding clamps 4 and 5 have clamp elements 6 serving to secure on the apparatus the pipes being welded. Either of the expanding clamps 4, 5 is provided with an actuating cylinder 7, 8 respectively. The apparatus incorporates a cylinder 9 secured by its fixed part 10 to the respective supporting disk 3 and serving to move the movable expanding clamp axially and to draw together the ends of the pipes being welded.

The apparatus also comprises a drive 11 with drive rollers 12 and centering rollers 13, serving to move it along the pipes being welded. A ring welding transformer 14 is rigidly installed along the apparatus' axis. The secondary turn of the transformer 14 is connected by buses 15 with current-feeding shoes 16, 17, fixedly mounted on the clamp elements 6 of the expanding clamps 4, 5.

According to the invention, the fixed expanding clamp 4, the movable expanding clamp 5, and the cylinders 7, 8 and 9 are enclosed within the carrying body 1 and installed in a coaxial relationship. Movable parts 18, 19 of the respective actuating cylinders 7, 8 of the expanding clamps 4 and 5 are coupled with the clamp elements 6 and adpated for movement on the inside surface of the carrying member 1. The cylinder 9 serving to move the movable expanding clamp 5 axially is connected by its movable part 20 with the actuating cylinder of this clamp. A section 21 of the apparatus' hydraulic equipment adjoins the supporting disk 3.

It is well known that any cylinder consists essentially of two parts, namely a cylinder body and a piston with a rod, and that either the former or the latter part of the cylinder may be movable or fixed, which depends upon the specific requirements. In the further description of the embodiments of the present invention, whenever a movable or fixed part of the cylinder is mentioned, a full description of the part will therefore be given.

According to one modification of the invention, the carrying body 1 (FIG. 1) is tubular and has slots 22 through which the clamp elements 6 extend outwardly. Each of the clamp elements 6 comprises a shackle 23 whose one end carries a pivotally mounted block 24 with current-feeding shoes 16, 17; the other end of the shackle 23 is pivotally coupled with the movable part 18 or 19 of the actuating cylinder 7 or 8 of the expanding clamp 4 or 5 respectively. The movable part 18 or 19 of the cylinder 7 or 8 respectively is the body of the cylinder, to which body an elongated part 26 or 25 respectively is attached, said part having rolling bearings in the form of rollers 27 which contact the inner surface of the tubular body 1.

The inner space of the body 18 of the actuating cylinder 7 of the fixed expanding clamp 4 is divided by a partition 28 into two chambers, either of which has a pressure line and a drain line (the lines are not shown) and houses a piston 29. The pistons 29 are secured to one end of a rod 30; the other end of the rod 30 is rigidly attached to the supporting disk 2 so that the rod 30 is the fixed part of the cylinder 7.

Each block 24 of the expanding clamp 4, 5 is pivotally connected with one end of a tie rod 31 whose other end is pivotally connected to the outside surface of the tubular body 1.

The inner space of the body 10 of the cylinder 9 serving to move the movable expanding clamp 5 axially is divided by a partition 32 into two chambers, either of which has a pressure line and a drain line (the lines are not shown) and houses a piston 33. The pistons 33 are secured to one end of the rod 20. The other end of the rod 20 as well carries pistons 34 rigidly attached thereto and disposed in the respective chambers of the actuating cylinder 8 of the movable expanding clamp 5.

The body 10 of the cylinder 9 serving to move the movable expanding clamp 5 axially is rigidly attached to the supporting disk 3 and thus is the fixed part of the cylinder.

Rigidly secured on the rod 20 is a disk 35 pivotally coupled with one end of each tie rod 31 whose other end is pivotally coupled with the block 24 of the movable expanding clamp 5.

The slots 22 in the tubular body 1, wherethrough the chackles 23 extend outwardly, are closed with a ring 36 put onto the body 1 for a sliding movement thereof.

It is to be pointed out that while being the movable part of the cylinder 9 serving to move the expanding clamp 5 axially, the rod 20 is at the same time the fixed part of the actuating cylinder 8 of this device, which will be more clear from the explanation of functioning of the above-described embodiment of the invention.

The above-described modification of the resistance butt welding apparatus of the invention functions as follows.

The apparatus is introduced into a pipe 37 (FIG. 1) to be welded and moved until the end of the pipe 37 is at the midpoint between the shoes 16 and 17. A working fluid under pressure is then fed into cavities A of the cylinder 7. Because the rod 30 is rigidly attached to the supporting disk 2, the body 18 of the actuating cylinder 7 of the fixed expanding clamp 4 moves on the inner surface of the body 1 towards said end of the pipe 37. This causes the shackles 23, whose outer ends are held by tie rods 31, to turn counterclockwise and thereby to press the blocks 24 against the inside surface of the pipe 37. Locating the apparatus inside the first pipe to be welded is thus accomplished.

A second pipe 38 to be welded is then put onto the free end of the welding apparatus until the end of the pipe thrusts against the end of the first pipe 37.

Next, the working fluid under pressure is fed into the cavities B of the actuating cylinder 8 of the movable expanding clamp 5. Because pistons 33 thrust (not shown) against the ends of the chambers of the cylinder 9 serving to move the movable expanding clamp 5 axially, the body 19 of the actuating cylinder 8 of the movable expanding clamp 5 moves towards the butt joint of the pipes to be welded. This causes the shackles 23, whose outer ends are held by tie rods 31, to turn clockwise and thereby to press the blocks 24 against the inner surface of the second pipe 38 to be welded. Locating the second pipe with respect to the apparatus is thus accomplished.

Current is then fed to the welding transformer 14 and the working fluid under pressure is admitted into cavities C of the cylinder 9 serving to move the movable expanding clamp 5 axially. This causes the rod 20 of the cylinder 9 to move towards the butt joint; when moving, the rod 20 shifts the cylinder body 19 with the clamp elements 6 and the disk 35. The second pipe 38 to be welded, gripped by the blocks 24, moves jointly with the movable expanding clamp 5.

The welding current fuses and heats the pipe ends. After they are sufficiently heated, the upsetting is carried out, which is provided by a further movement of the rod 20 of the cylinder 9 serving to move the movable expanding clamp 5 axially.

After the welding has been completed, the working fluid is admitted to all the cylinders 7, 8, 9 into their cavities opposite to the cavities A, B, C; this causes the apparatus' devices to return to the initial position. Acted upon by the drive 11, the apparatus rides on the rollers 12 out of the welded pipes until the midpoint of the distance between the shoes 16 and 17 is disposed in one plane with the face of the free end of the second pipe 38 having been welded.

According to another modification of the invention, the elongated carrying body (FIG. 2) is formed by at least two bars 1 secured by their ends to the supporting disks 2 and 3 and carrying the movable parts 18, 19, and 20 of the cylinders 7, 8 and 9 respectively. The fixed part 30 of the actuating cylinder 7 of the fixed expanding clamp 4 is the body of the cylinder 7, which body is rigidly attached to the supporting disk 2. The inner space of the body 30 of the cylinder 7 is divided by the partition 28 into two chambers, either of which houses the piston 29. The pistons 29 are fixedly mounted on the rod 18 which is the movable part of the cylinder 7 and whose end carries a fixedly secured spider 25 (shown only in the axial section). The spider 25 has apertures by which it is put onto the bars 1 of the carrying body for a sliding movement thereof. The shackles 23 are pivotally attached to the spiders 25 and carry on their other ends the pivotally mounted blocks 24 with the current-feeding shoes 16, 17. The blocks 24 are coupled with the supporting disk 2 by leaf springs 31.

The body 10 of the cylinder 9 serving to move the movable expanding clamp 5 axially is rigidly attached to the supporting disk 3. The inner space of the body 10 of the cylinder 9 is divided by the partition 32 into two chambers, either of which houses the piston 33 fixedly mounted on the rod 20 which is the movable part of the cylinder 9.

Rigidly secured on the end of the rod 20 is the disk 35 made in the form of a spider having apertures by which the spider is put onto the bars 1 of the carrying body for a sliding movement therealong.

The body 19 of the actuating cylinder 8 of the movable expanding clamp 5 is fixedly secured to the spider 35. The inner space of the body 19 of the cylinder 8 is divided by a partition 39 into two chambers, either of which houses the piston 34. The pistons 34 are fixedly mounted on the rod 19 which is the fixed part of the actuating cylinder 8 of the movable expanding clamp 5. The end of the rod 19 fixedly carries a spider 26 having apertures by which the spider is put onto the bars 1 for a sliding movement therealong. The shackles 23 are pivotally attached to the spider 26; the other ends of the shackles 23 are pivotally coupled with the blocks 24 whereto the current-feeding shoes 16, 17 are secured. The blocks 24 are coupled with the disk 35 by the leaf springs 31.

The output lead of the secondary winding of the transformer 14 is connected to at least two buses 15 secured to the outer surfaces of the leaf springs 31 of the fixed expanding clamp 4.

As will be seen from FIG. 2, the end of one bus 15 is through the shoe 16 coupled by means of a current-feeding jumper 40 with the current-feeding shoe 17 of the movable expanding clamp 5. An end of the other bus (not shown in the drawing) is simply secured on the leaf spring and, terminating, abuts only the current-feeding shoe 16 of the fixed expanding clamp 4. Such an arrangement provides for feeding current to the ends of the pipes being welded.

The above modification of the resistance butt welding apparatus of the invention functions as follows.

The apparatus is introduced into the pipe 37 to be welded and moved until the end of the pipe 37 is at the midpoint between the shoes 16 and 17. The working fluid under pressure is then fed into cavities A of the cylinder 7. Because the body 30 of the cylinder 7 is rigidly attached to the supporting disk 2, the rod 18 of the actuating cylinder 7 of the fixed expanding clamp 4 moves towards said end of the pipe 37. The rod 18 moves coaxially with the carrying member 1 since the spider 25 slides along the bars 1 which serve as guides therefor. This movement causes the shackles 23, whose outer ends are held by the leaf springs 31, to turn counterclockwise and thereby to press the blocks 24 against the inside surface of the pipe 37. Locating the apparatus is thus accomplished.

The second pipe 38 to be welded is then put onto the free end of the welding apparatus until the end of the pipe thrusts against the end of the first pipe 37.

Next, the working fluid under pressure is admitted into cavities B of the actuating cylinder 8 of the movable expanding clamp 5. This causes the rod 19 of the actuating cylinder 8 of the movable expanding clamp 5 to move towards the butt joint of the pipes to be welded; this movement is coaxial with respect to the carrying body 1 since the spiders 26 slide along the bars 1. This causes the shackles 23, whose outer ends are held by the leaf springs 31, to turn clockwise and thereby to press the blocks 24 against the inside surface of the second pipe 38 to be welded. Locating the second pipe on the apparatus and aligning the second pipe with the first one are thus accomplished.

Current is then fed to the welding transformer 14 and the working fluid under pressure is admitted into cavities C of the cylinder 9 serving to move the movable expanding clamp 5 axially. This causes the rod 20 of the cylinder 9 to move towards the butt joint; when moving, the rod 20 shifts the body 19 of the cylinder 8 with the clamp elements 6 and the disk 35. The second pipe 38 to be welded, gripped by the blocks 24, moves jointly with the movable expanding clamp 5. The current flowing through the butt joint fuses and heats the ends of the pipes. After they are sufficiently heated, the upsetting is carried out, which is provided by a further movement of the rod 20 of the cylinder 9.

After the welding has been completed, the working fluid is fed to the cavities of all the cylinders 7, 8, 9, opposite to cavities A, B, C; this causes the apparatus' devices to return to the initial position. Acted upon by the drive 11, the apparatus rides on the rollers 12, 13 out of the welded pipes until the midpoint of the distance between the shoes 16 and 17 is disposed in one plane with the face of the free end of the pipe 38.

While particular embodiments of the invention have been shown and described, various modifications thereof will be apparent to those skilled in the art, and therefore it is not intended that the invention be limited to the disclosed embodiments or to the details thereof, and departures may be made therefrom within the spirit and scope of the invention as defined in the following claims.

What is claimed is:

1. A pipe resistance butt welding apparatus disposable within two pipes to be welded, comprising:
an elongated carrying body having means defining an inner surface and two coaxially mounted disks and carrying a plurality of elements, said elements including:
a fixed expanding clamp for holding one of the pipes to be welded in position with respect to said apparatus, comprising first clamp elements and a first actuating cylinder, said first actuating cylinder consisting of a first movable part and a first fixed part, the first movable part of said first actuating cylinder being coupled with said first clamp elements and adapted for movement on the inner surface of said carrying body, and the first fixed part being rigidly attached to a respective one of said coaxially mounted disks;

a movable expanding clamp for locating said apparatus in the other of the pipes to be welded, comprising second clamp elements and a second actuating cylinder, said second actuating cylinder consisting of a second movable part and a second fixed part, the second movable part of said second actuating cylinder being coupled with said second clamp elements and adapted for movement on the inner surface of said carrying body;

a third cylinder serving to move said movable expanding clamp axially for drawing together ends of the pipes to be welded and accomplishing upsetting of the pipe ends, said third cylinder consisting of a third movable part and a third fixed part, of which the third movable part is connected with said second actuating cylinder of the movable expanding clamp and the third fixed part is rigidly attached to the other of said coaxially mounted disks, said fixed expanding clamp, movable expanding clamp, said first and said second actuating cylinders, and said third cylinder being installed in a coaxial relationship;

drive means for moving said apparatus along the pipes being welded, and a ring welding transformer.

2. An apparatus as defined in claim 1, wherein the carrying body is made in the form of a tube having slots through which the first clamp elements extend outwardly, the first and second movable parts of the first and second actuating cylinders having rolling bearings, the first fixed part of the first actuating cylinder being a rod, and the third movable part of the third cylinder serving to move the movable expanding clamp axially, the second actuating cylinder having a common rod with the third cylinder which carries a rigidly installed disk pivotally coupled by tie rods with the second clamp elements.

3. A pipe resistance butt welding apparatus disposable within two pipes to be welded, comprising:

an elongated carrying body having two coaxially mounted disks, said body being formed by at least two bars secured at their ends to said disks and carrying a plurality of elements, said elements including:

a fixed expanding clamp for holding one of the pipes to be welded in position with respect to said apparatus, comprising first clamp elements and a first actuating cylinder, said first cylinder consisting of a first movable part and a first fixed part, the first movable part of said first cylinder being coupled with said first clamp elements and adapted for movement on the bars of said carrying body, and the first fixed part being rigidly attached to a respective one of said coaxially mounted disks;

a movable expanding clamp for locating said apparatus in the other of the pipes to be welded, comprising second clamp elements and a second actuating cylinder, said second cylinder consisting of a second movable part and a second fixed part, the second movable part of said second cylinder being coupled with said second clamp elements and adapted for movement on the bars of said carrying body;

a third cylinder serving to move said movable expanding clamp axially for drawing together ends of the pipes to be welded and accomplishing upsetting of the pipe ends, said third cylinder consisting of a third movable part and a third fixed part, of which the third movable part is connected with said second actuating cylinder of the movable expanding clamp and the third fixed part is rigidly attached to the other of said coaxially mounted disks, said fixed expanding clamp, movable expanding clamp, said first and said second actuating cylinders, and said third cylinder being installed in a coaxial relationship;

drive means for moving said apparatus along the pipes being welded, and a ring welding transformer.

4. An apparatus as defined in claim 3, wherein the first fixed part of the first actuating cylinder is the body of the first cylinder, and wherein the movable part of the third cylinder serving to axially move the movable expanding clamp is a rod coupled with the fixed part of the second actuating cylinder, which fixed part is the body of the second cylinder, said rod carrying a disk coupled by leaf springs with current-feeding shoes disposed on the first and second clamp elements.

5. An apparatus as defined in claim 4, wherein the welding transformer is connected with the current-feeding shoes by at least two buses disposed on the leaf springs of the fixed expanding clamp, the end of one bus being secured to the current-feeding shoe of this clamp, and the end of the other bus being coupled by a flexible jumper with the current-feeding shoe of the movable expanding clamp.

* * * * *